United States Patent
Kandula et al.

(10) Patent No.: US 10,496,298 B2
(45) Date of Patent: Dec. 3, 2019

(54) CONFIGURABLE FLUSH OF DATA FROM VOLATILE MEMORY TO NON-VOLATILE MEMORY

(71) Applicant: Intel Corporation, Santa Clara, CA (US)

(72) Inventors: Phani Kumar Kandula, Bangalore (IN); Bharat S. Pillilli, El Dorado Hills, CA (US); Suresh Chemudupati, Austin, TX (US); Yi-Feng Liu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 15/856,780

(22) Filed: Dec. 28, 2017

(65) Prior Publication Data

US 2019/0205042 A1    Jul. 4, 2019

(51) Int. Cl.
*G06F 3/06* (2006.01)
*G06F 9/4401* (2018.01)

(52) U.S. Cl.
CPC .......... *G06F 3/0619* (2013.01); *G06F 3/0629* (2013.01); *G06F 3/0647* (2013.01); *G06F 3/0653* (2013.01); *G06F 3/0685* (2013.01); *G06F 9/4403* (2013.01)

(58) Field of Classification Search
CPC .... G06F 3/0619; G06F 3/0629; G06F 3/0647; G06F 3/0653; G06F 3/0685; G06F 9/4403; G06F 3/06; G06F 9/4401
USPC ........................................................ 711/159
See application file for complete search history.

(56) References Cited

U.S. PATENT DOCUMENTS

| | | | |
|---|---|---|---|
| 8,522,004 B2 * | 8/2013 | Borras | G06F 1/3203 713/2 |
| 2009/0249175 A1 * | 10/2009 | Chandra | G06F 11/00 714/822 |
| 2010/0008175 A1 | 1/2010 | Sweere et al. | |
| 2011/0066872 A1 | 3/2011 | Miller | |
| 2012/0331281 A1 * | 12/2012 | Borras | G06F 1/3203 713/2 |
| 2013/0142001 A1 * | 6/2013 | Sweere | G06F 12/0866 365/229 |
| 2015/0135008 A1 * | 5/2015 | Lucas | G06F 11/2017 714/14 |
| 2016/0062680 A1 * | 3/2016 | Samuels | G06F 3/0616 711/103 |

(Continued)

FOREIGN PATENT DOCUMENTS

WO    2012082792    6/2012

OTHER PUBLICATIONS

International Search Report & Written Opinion dated Mar. 15, 2019 for PCT Patent Application No. PCT/US2015/063910.

*Primary Examiner* — Pierre Miche Bataille
(74) *Attorney, Agent, or Firm* — Green, Howard & Mughal LLP

(57) ABSTRACT

An apparatus is provided which includes: a first storage to store one or more parameters, a second storage to store data, and a third storage. The apparatus may further include a first circuitry to detect a triggering event. The apparatus may further include a second circuitry to, in response to the triggering event, cause transfer of the data from the second storage to the third storage, while one or more components of the apparatus is to operate in accordance with the one or more parameters.

20 Claims, 6 Drawing Sheets

(56) References Cited

U.S. PATENT DOCUMENTS

| | | | |
|---|---|---|---|
| 2016/0378660 A1* | 12/2016 | Gendler | G06F 1/3287 |
| | | | 711/105 |
| 2017/0160955 A1* | 6/2017 | Jayasena | G11C 11/005 |
| 2017/0212687 A1* | 7/2017 | Kelly | G06F 1/3225 |
| 2017/0277605 A1 | 9/2017 | Petersen | |
| 2017/0364134 A1 | 12/2017 | Kelly et al. | |
| 2018/0364935 A1* | 12/2018 | Sundrani | G06F 3/0635 |

* cited by examiner

CONFIGURABLE FLUSH OF DATA FROM VOLATILE MEMORY TO NON-VOLATILE MEMORY

BACKGROUND

Data stored in a volatile memory may be lost when the volatile memory is not powered for at least a threshold period of time, and the data within the memory is not refreshed for at least the threshold period of time.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
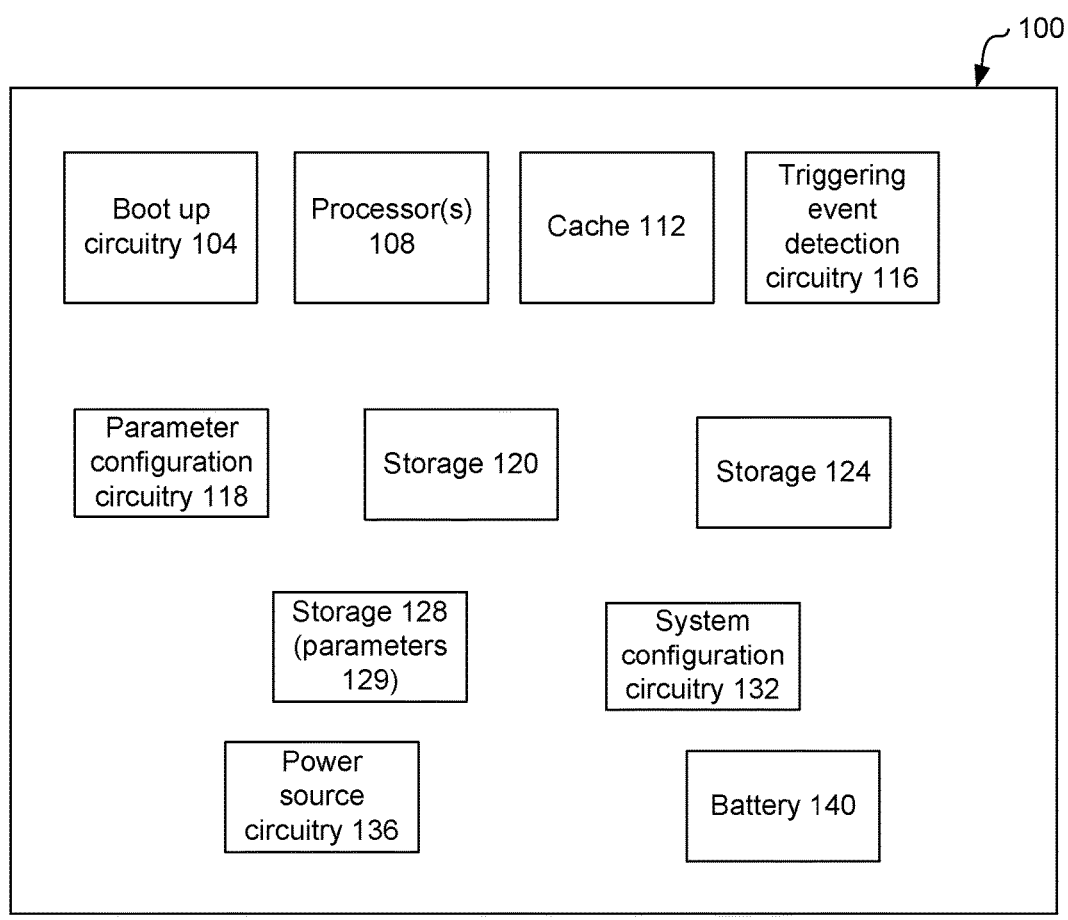
FIG. 1 illustrates a device that transfers data from a first storage (e.g., a volatile storage) to a second storage (e.g., a non-volatile storage) in a configurable manner, in response to a detection of a triggering event, according to some embodiments.

A device may have a battery backup and/or an alternate power source such as a super capacitor, e.g., in addition to power from an Alternating Current (AC) source. A triggering event in the device may comprise loss of power from the AC source, may comprise an error in the device (e.g., a critical hardware error, a critical software error, a system crash, etc.), and/or may comprise any appropriate event that may necessitate a shutdown or reset of the device. In response to a detection of a triggering event, it may be useful to transfer data from a volatile storage of the device to a non-volatile storage (e.g., such that the data is not lost or corrupted in the volatile storage due to possible unavailability of power, possible shutdown of the device, etc.).

In an example, while the data is being transferred from the volatile storage to the non-volatile storage, not all components of the device may be used for the data transfer. In another example, power available for such data transfer (e.g., from a battery and/or an alternate power source) may be limited, e.g., if the data transfer is necessitated due to loss of AC power. The power available for such data transfer may be based on the battery capacity, remaining charge of the battery, aging of the battery, and/or other factors. In some embodiments, operating parameters of various components, while the data is being transferred, may be configurable.

Merely as an example, if relatively more power is available, the data transfer may be performed in less time, without caring much about the power to be used for the data transfer. On the other hand, if limited or relatively less power is available, the data transfer may be performed at a slow rate, e.g., to conserve power needed for the data transfer. Various embodiments of this disclosure discuss configuring the device specifically when data is being transferred from the volatile storage to the non-volatile storage in response to a triggering event, e.g., to have a balance between power consumed for the transfer, speed of transfer, etc. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates a device 100 that transfers data from a first storage 120 (e.g., a volatile memory) to a second storage 124 (e.g., a non-volatile storage) in a configurable manner, in response to a detection of a triggering event, according to some embodiments. In some embodiments, the device 100 comprises the storages 120 and 124. In some other embodiments (and at least in part contrary to the illustration of FIG. 1), the storage 124 may be external to the device 100, but may be plugged to, or coupled to, the device 100 (e.g., the storage 124 may be an external flash memory, an external hard drive, etc.).

In some embodiments, the storage 120 may be a volatile memory, such as a Random Access Memory (RAM), a Dynamic Random Access Memory (DRAM), etc. Merely as an example, the storage 120 may be implemented as one or more dual in-line memory modules (DIMMs).

The storage 120 may need power to maintain stored information. The storage 120 may retain its contents while powered on—but when the power is interrupted, the stored data may be lost very rapidly. In an example, the storage 120 may be electrically refreshed at periodic (or aperiodic) intervals to retain data.

In an example, a memory controller (not illustrated in FIG. 1) associated with the storage 120 may cause the refreshing of the data in the storage 120 (e.g., during a normal or regular operation of the storage 120). In an example, the storage 120 may also operate in a self-refresh state. When the storage 120 is in the self-refresh state, the storage 120 may refresh the data on its own, e.g., without any intervention or facilitation from the memory controller. Thus, when the storage 120 is in the self-refresh state, the memory controller may be powered down, in a low power mode, in a power gated and/or a clock gated state, disabled, undergoing a reset cycle, etc.

The storage 124 may be a non-volatile memory or a non-volatile storage. Examples of such non-volatile storage 124 may include read-only memory (ROM), flash memory, flash drive, ferroelectric RAM, magnetic computer storage device (e.g. hard disk drive), solid state drive, optical disc, external hard drive, etc. The storage 124 may not need continuous power supply to maintain stored information. The storage 120 may retain its contents while being powered off.

In some embodiments, the device 100 comprises another storage 128. In an example, the storage 128 may comprise one or more registers, although in some other examples the storage 128 may be a part of one of the storages 120 or 124. In an example, the storage 128 stores one or more parameters 129. In some embodiments, transfer of data from the storage 120 to the storage 124 (e.g., after detection of a triggering event) may be in accordance with the one or more parameters 129, as discussed herein later in further detail.

In some embodiments, the device 100 may comprise a boot up circuitry 104 (also referred to as circuitry 104). The circuitry 104 may facilitate booting process of the device 100. For example, when the device 100 is powered on or started (or reset after a power loss event, or after an error condition), the circuitry 104 may be initially powered on. The circuitry 104 may then initialize and boot various other components (e.g., one or more processors) of the device 100. Thus, the circuitry 104 may be used for hardware initialization during the booting process. In an example, the circuitry 104 may comprise a Platform Controller Hub (PCH), e.g., which may be present in chipset architecture developed by Intel Corporation®. In an example, the circuitry 104 may comprise Basic Input/Output System (BIOS) of the device 100.

In some embodiments, the device 100 comprises one or more processors 108. For example, the processors 108 can include one or more physical devices, such as microprocessors, application processors, microcontrollers, programmable logic devices, or other processing means. The processing operations performed by the processors 108 may include the execution of an operating platform or operating system on which applications and/or device functions of the device 100 may be executed. The processing operations may also include operations related to I/O (input/output) with a human user or with other devices, operations related to power management, operations related to connecting the device 100 to another device, operations related to audio I/O and/or display I/O, or any other appropriate operations of the device 100. In an example and as will be discussed in further details herein, processing operations performed by the processors 108 may include facilitating transfer of data between storages 120 and 124. In some embodiments, the processors 108 may comprise one or more multi-core processors. For example, the processors 108 may have a plurality of processing cores.

In some embodiments, the device 100 may comprise cache 112. The cache 112 may comprise level 1 (L1) cache, level 2 (L2) cache, and/or the like. In an example, the processors 108 may access data from the cache 112, temporarily store data in the cache 112, and/or the like.

In some embodiments, the device 100 may comprise a triggering event detection circuitry 116 (also referred to as circuitry 116). The circuitry 116 may detect one or more triggering events in the device 100. Merely as an example, a triggering event may comprise loss of power from an AC source (e.g., which may be supplied via an adapter and a power source circuitry 130). In another example, a triggering event may comprise a charge level of a battery 140 supplying power to the device 100 depleting below a threshold value (e.g., with the AC power not being available from the power source circuitry 136). In yet another example, a triggering event may comprise an error in the device 100 (e.g., a critical hardware error, a critical software error, a system crash, etc.), which may necessitate a shutdown or reset of the device 100. In an example, a triggering event may comprise any appropriate event that may necessitate a shutdown or reset of the device 100, e.g., may necessitate an immediate or near immediate shutdown or reset of the device 100, without having sufficient power and/or opportunity to gracefully and systematically shutting down (or resetting) the device 100.

In some embodiments, in response to a detection of a triggering event, one or more processing cores of the processors 108 (or another appropriate component of the device 100) may transfer data from the volatile storage 120 to the non-volatile storage 124 (e.g., to prevent loss of data in the volatile storage 120 due to the imminent shutdown or resetting of the device 100).

In some embodiments, the device 100 further comprises a configuration circuitry 118 (also referred to as circuitry 118). The circuitry 118 may store and/or configure the parameters 129. For example, transfer of data from the storage 120 to the storage 124 (e.g., in response to detection of a triggering event) may be in accordance with the one or more parameters 129. In an example, the circuitry 118 may comprise the BIOS of the device 100, a baseboard management controller (BMC) of the device 100, an Innovation Engine (IE) of the device 100, and/or the like.

In some embodiments, the device 100 may further comprise system configuration circuitry 132 (also referred to as circuitry 132). Merely as an example, the circuitry 132 may comprise the PCH of the device 100, a Power Management Controller (PMC), a Converged Security and Manageability Engine (CSME), and/or another appropriate component of the device 100.

The circuitry 132 may configure one or more components of the device 100, e.g., at least when data is being transferred from the storage 120 to the storage 124 upon detecting a triggering event. For example, the circuitry 132 may control a state of various processing cores of the processors. For example, the circuitry 132 may control an operating voltage and/or an operating frequency of individual processing cores of the processors 108, selectively power gate and/or clock gate one or more processing cores of the processors 108, selectively power gate and/or clock gate one or more other components of the device 100, selectively disable one or more components of the device, and/or the like. The circuitry 132 may also select a number of processing cores of the processors 108 that are to be operational or working at a normal state (e.g., S0 state), a number of processing cores of the processors 108 that are to be disabled or non-operational (e.g., in a low power state, in an off state, in a power gated and/or clock gated state, etc.), e.g., at least when data is being transferred from the storage 120 to the storage 124 upon detecting a triggering event.

In some embodiments, the device 100 may comprise multiple IP (Intellectual Property) blocks. An IP block may be a reusable unit of logic, cell, or integrated circuit layout design that may be the intellectual property of another party. Examples of IP blocks may include an I/O circuit (e.g., a Universal Serial Bus or USB circuitry), a Serializer/Deserializer (SerDes) circuitry, a phase locked loop (PLL) circuitry, a physical layer (PHY) circuitry, etc. In an example, the circuitry 132 may also cause one or more IP blocks to be operational or working, and cause one or more other IP blocks to be non-operational (e.g., in a low power state, in an off state, in a power gated and/or clock gated state, etc.), e.g., at least when data is being transferred from the storage 120 to the storage 124 upon detecting a triggering event.

In some embodiments, the circuitry 132 may configure one or more components of the device 100, based on the one or more parameters 129. For example, when transferring data from the storage 120 to the storage 124 (e.g., in response to a detection of a triggering event), the circuitry 132 may configure one or more components of the device 100, based on the one or more parameters 129.

In some embodiments, the one or more parameters 129 may dictate a mode at which the device 100 operates, e.g., when transferring data from the storage 120 to the storage 124 in response to the detection of a triggering event. Merely as examples, the device 100 may operate at one of a base mode, an aggressive power mode, an aggressive performance mode, or another appropriate mode, when transferring data from the storage 120 to the storage 124 in response to the detection of a triggering event.

In the base mode, the circuitry 132 may, while data is being transferred from the storage 120 to the storage 124 in response to a detection of a triggering event, cause one or more components (e.g., one or more processing cores, components, IP blocks, etc.) to be operational, while disabling (e.g., power gating and/or clock gating) another one or more components. For example, the one or more components may be used, or associated with, the transfer of data from the storage 120 to the storage 124—hence, the circuitry 132 may cause the one or more components to be operational. For example, the voltage and/or frequency of the one or more components may be maintained at their respective normal or typical levels, if the device 100 operates in the base mode. Some components may not be needed to transfer the data from the storage 120 to the storage 124, e.g., network interfaces, display I/O, audio I/O, etc., and these components may be disabled.

In an aggressive power mode, the circuitry 132 may, while data is being transferred from the storage 120 to the storage 124 in response to a detection of a triggering event, cause one or more components (e.g., one or more processing cores, components, IP blocks, etc.) to be operational, while disabling (e.g., power gating and/or clock gating) another one or more components. For example, the one or more components may be used, or associated with, the transfer of data from the storage 120 to the storage 124—hence, the circuitry 132 may cause the one or more components to be operational. However, unlike the base mode (e.g., where the voltage and/or frequency of the one or more components were maintained at their respective normal or typical levels), in the aggressive power mode, the voltage and/or frequency of the one or more components may be maintained at a nominal level (e.g., at a minimum level that is necessary to maintain operation of these components).

In an aggressive performance mode, the circuitry 132 may, while data is being transferred from the storage 120 to the storage 124 in response to a detection of a triggering event, cause one or more components to be operational, while disabling another one or more components. However (e.g., unlike the base mode or the aggressive power mode), in the aggressive performance mode, the voltage and/or frequency of one or more components may be maintained at level that results in high performance of the components (e.g., that results in a faster data transfer rate from the storage 120 to the storage 124).

Merely as an example, assume a component of the first one or more components (e.g., a processing core) can operate at a voltage range of 5 volts (V) to 6 V. For example, the component may typically or normally operate at a voltage range of 5.4 V to 5.6 V. A nominal or minimum voltage to operate the component may be 5 V (although, for example, the performance of the component is slower at 5 V, than at the range of 5.4-5.6 V). A maximum voltage to operate the component may be 6 V. Also assume that the component facilitates in transfer of data from the storage 120 to storage 124. In an example, in the base mode, the component may be operated at the range of 5.4-5.6 V, which may result in moderate speed of data transfer from the storage 120 to the storage 124, and which may consume moderate power. On the other hand, in the aggressive power mode, the component may be operated at 5 V, which may result in a relatively low speed of data transfer from the storage 120 to the storage 124, but may consume low power. In the aggressive performance mode, the component may be operated at 6 V, which may result in a relatively high speed of data transfer from the storage 120 to the storage 124, and may consume high power.

In some embodiments, a number of components (e.g., processing cores) that are operational (e.g., while data is being transferred from the storage 120 to the storage 124 in response to a detection of a triggering event) may also be based on the mode. For example, in the aggressive performance mode, a higher number of processing cores may be made operational, thereby resulting in a faster data transfer. In contrast, in the aggressive power mode, a lower number of processing cores may be made operational, thereby resulting in a lower data transfer. In the base mode, an intermediate number of processing cores may be made operational, thereby resulting in a moderate data transfer.

Thus, the aggressive performance mode may facilitate faster data transfer, but may also consume higher power. On the other hand, the aggressive power mode may facilitate slower data transfer, and may consume lower power. The power consumption and the data transfer speed of the base mode may be in between the aggressive performance mode and the aggressive power mode.

In some embodiments, a mode that is activated (e.g., while data is being transferred from the storage 120 to the storage 124 in response to a detection of a triggering event) may be a configurable parameter. For example, the parameter 129 may dictate a mode that is to be activated.

In an example, the mode to be activated may be set by a user of the device 100, a manufacturer of the device 100, and/or the like. In another example, the mode to be activated may be based on an available battery capacity of the battery 140 (e.g., when the triggering event is a loss of AC power), a time that the battery 140 takes to recharge, a type of the battery 140, a type and/or a rating of a super capacitor that may be used to power the data transfer from the storage 120 to the storage 124 (e.g., instead of, or in addition to, the power from the battery 140), etc. For example, if the charge level of the battery is high (e.g., higher than a threshold), the aggressive performance mode may be activated; and if the charge level of the battery is low, the aggressive power mode or the base mode may be activated.

In another example, the mode to be activated may be based on an amount of data to be transferred from the storage 120 to the storage 124. For example, if large amount of data (e.g., larger than a threshold) is to be transferred, the aggressive performance mode may be activated; otherwise the aggressive power mode or the base mode may be activated.

In yet another example, the mode to be activated may be based on the type of triggering event. For example, if the triggering event is due to an error in the device and AC power is still available to the device, the aggressive performance mode (or the base mode) may be activated. On the other hand, if the triggering event is due to a loss of AC power received via the power source circuitry 136 (and possibly the battery charge remaining is less than a threshold), the aggressive power mode (or the base mode) may be activated.

Although three modes (e.g., the base mode, the aggressive power mode, and the aggressive performance mode) are discussed herein above, any other appropriate mode may also be envisioned by those skilled in the art, based on the teachings of this disclosure. In some examples, a combination of two or modes may be used. For example, a first processing core may be run with highest voltage and/or frequency level (e.g., in accordance with the aggressive performance mode), while a second processing core may be run with normal or typical voltage and/or frequency level (e.g., in accordance with the base mode).

In some embodiments, in addition to, or instead of, activating a mode, the parameters 129 may specify operating parameters for a single component, or a group of components, or individual components of the device 100 (e.g., to operate while data is being transferred from the storage 120 to the storage 124 in response to a detection of a triggering event).

Figure 2:
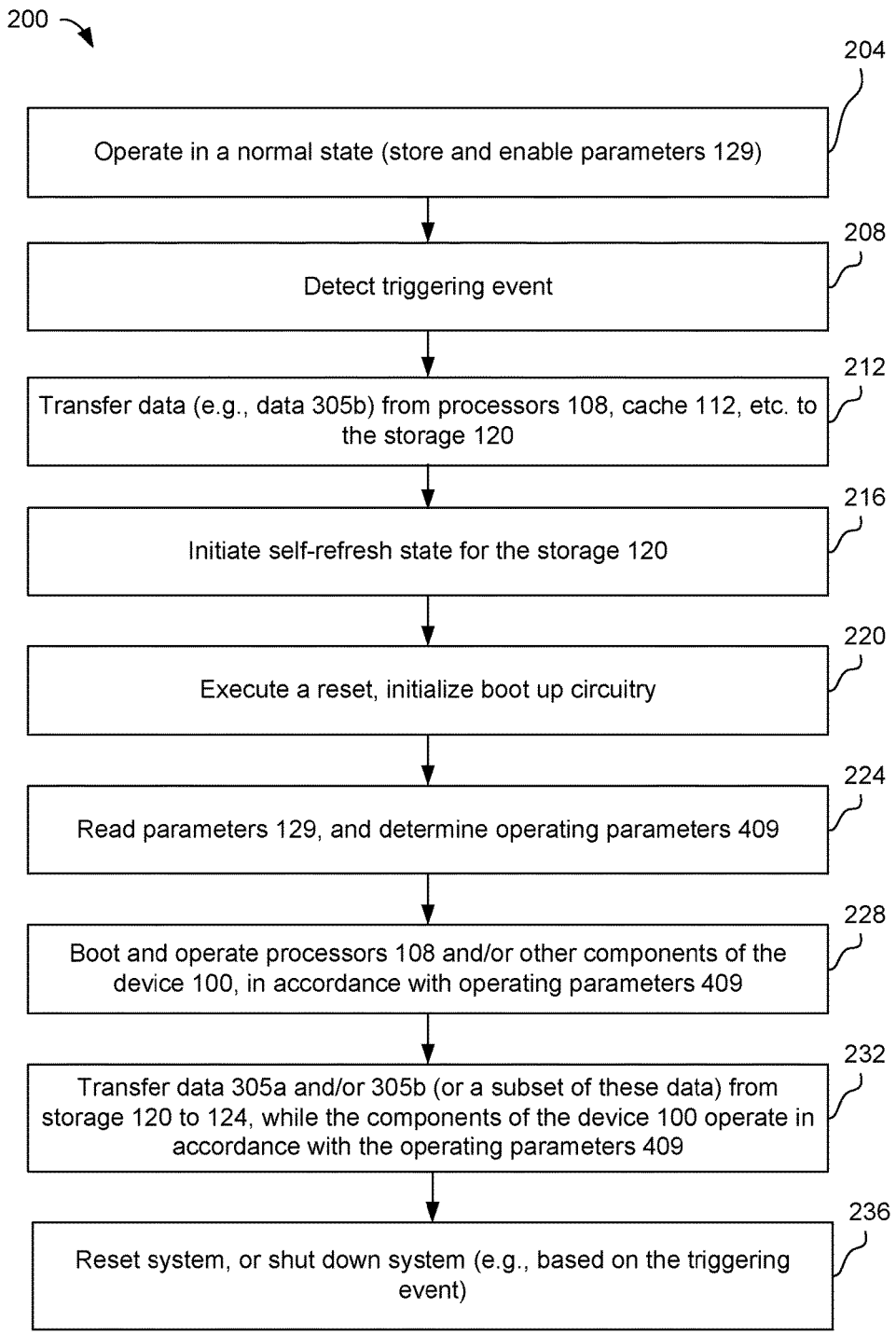
FIG. 2 illustrates a flowchart depicting a method for operating a device to transfer data from a first storage to a second storage in a configurable manner, in response to a detection of a triggering event, according to some embodiments.
Figure 3:
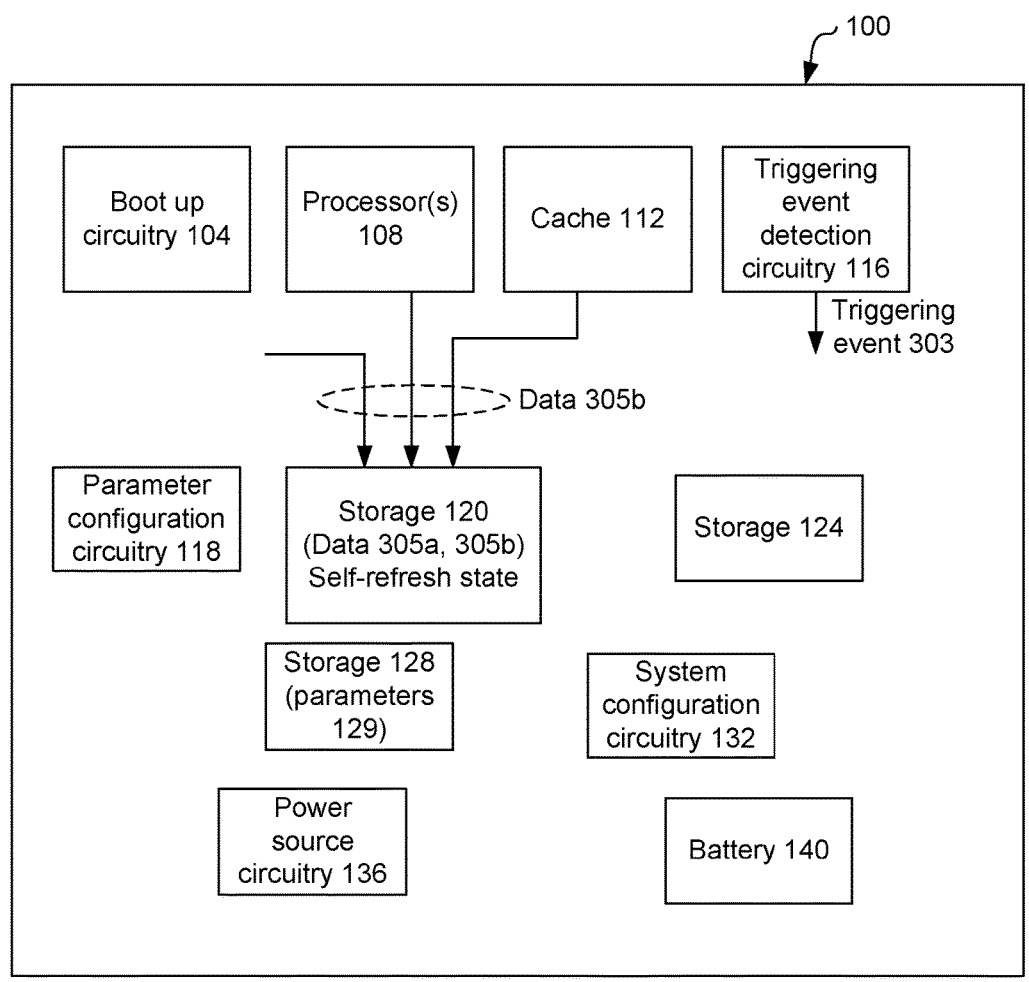
FIGS. 3-5 illustrate various operations of the device of FIG. 1, according to some embodiments.
Figure 4:
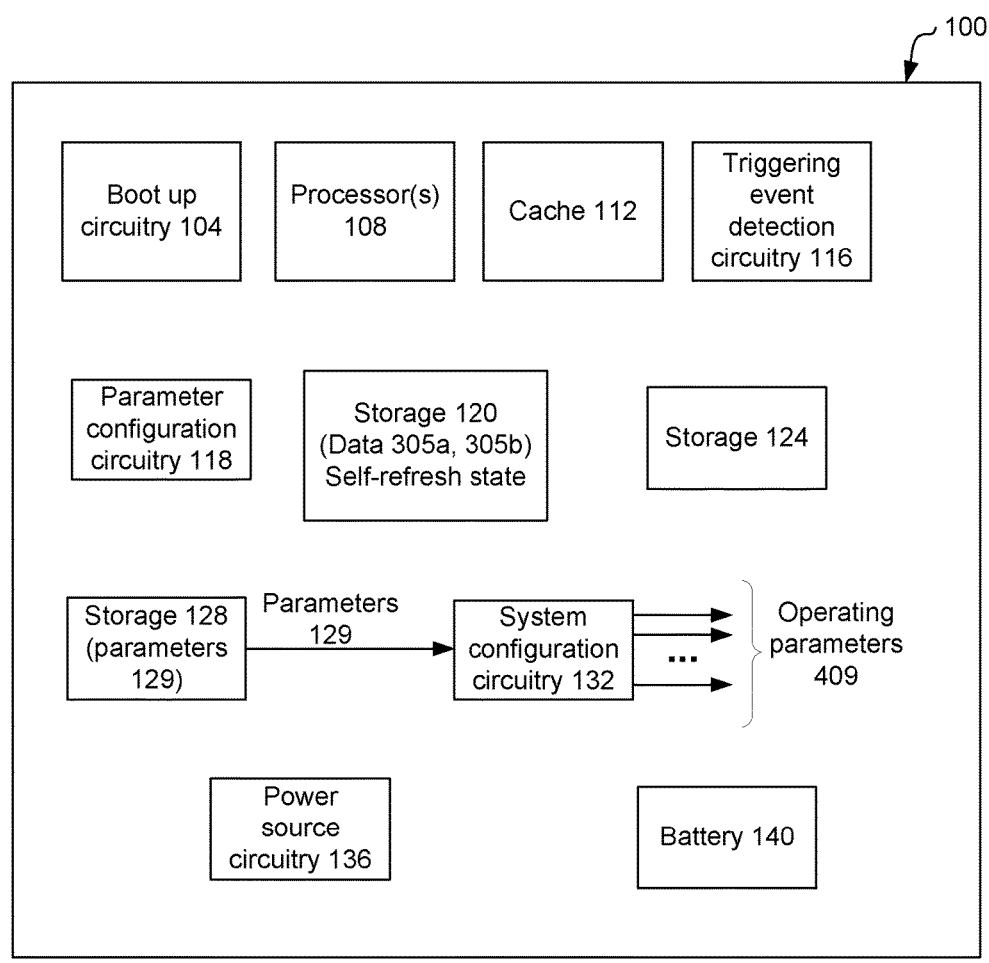
Figure 5:
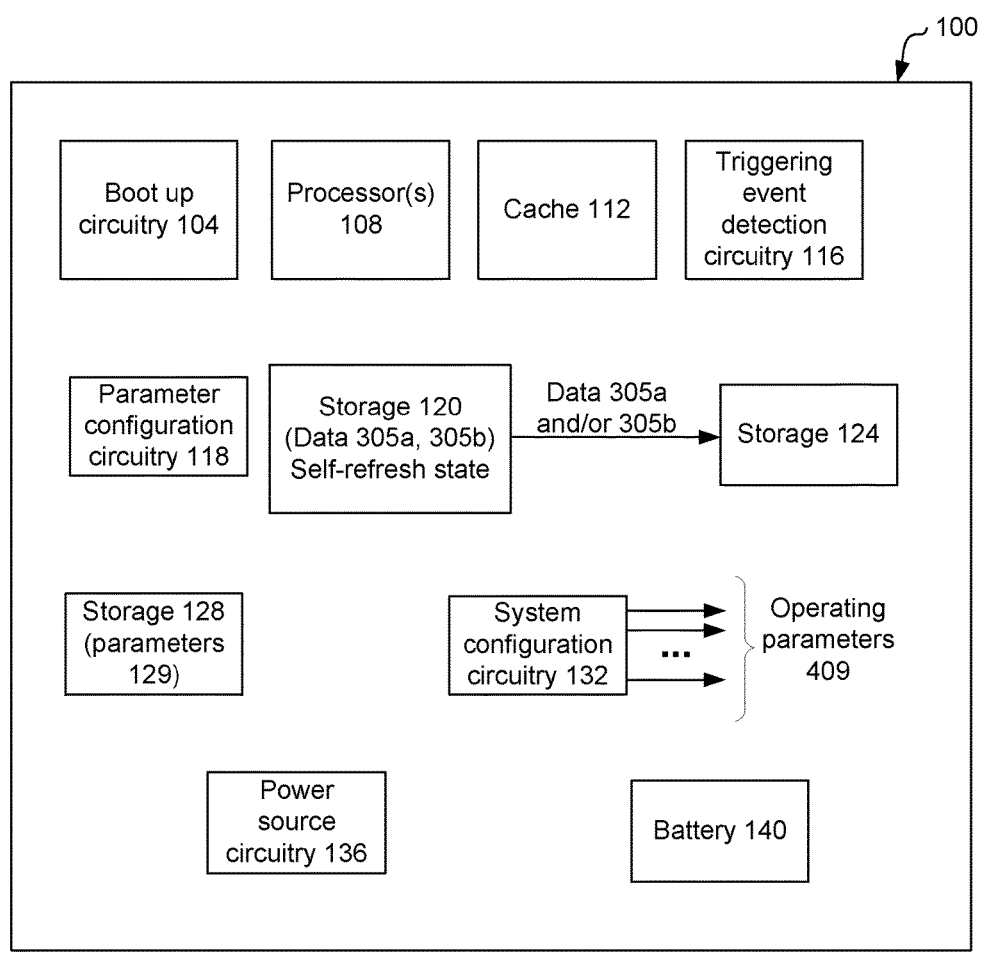

FIG. 2 illustrates a flowchart depicting a method 200 for operating a device (e.g., the device 100) to transfer data from a first storage 120 (e.g., a volatile memory) to a second storage 124 (e.g., a non-volatile storage) in a configurable manner, in response to a detection of a triggering event, according to some embodiments. FIGS. 3-5 illustrate various operations of the device 100 of FIG. 1, according to some embodiments. Thus, some operations of the method 200 of FIG. 2 are discussed with respect to one or more of FIG. 3-5.

Referring again to FIG. 2, although the blocks in the flowchart with reference to FIG. 2 are shown in a particular order, the order of the actions can be modified. Thus, the illustrated embodiments can be performed in a different order, and some actions/blocks may be performed in parallel. Some of the blocks and/or operations listed in FIG. 2 may be optional in accordance with certain embodiments. The numbering of the blocks presented is for the sake of clarity and is not intended to prescribe an order of operations in which the various blocks must occur.

At 204 of the method 200, the device 100 may operate in a normal state of operation. For example, the device 100 may operate in accordance with the S0 state of the Advanced Configuration and Power Interface (ACPI) Specification. In some embodiments, the device 100 (e.g., the circuitry 118) may configure and store the parameters 129 in the storage 128. In some embodiments, the device 100 (e.g., the circuitry 118) may enable transfer of data from the storage 120 to the storage 124 (e.g., enable the parameters 129).

At 208, a triggering event may be detected. For example, as illustrated in FIG. 3, the circuitry 116 may detect a triggering event 303. As discussed herein previously, the triggering event may comprise one or more of loss of power from an AC source, an error in the device 100 (e.g., a critical hardware error, a critical software error, a system crash, etc.), or another appropriate event that may necessitate a shutdown or reset of the device 100.

In some embodiments, if the triggering event 303 at 208 is a loss of power from an AC source, then the various subsequent operations of the method 200 may be performed using power from the battery 140, using power from an alternate power source (e.g., a super capacitor of the device 100, power from an Uninterrupted Power supply or UPS, etc.), and/or the like.

At 212, in response to detecting the triggering event 303, data 305*b* may be transferred from one or more components to the storage 120. For example, as illustrated in FIG. 3, data 305*b* may be transmitted from the processors 108, the cache 112, one or more registers of the device 100, and/or one or more other components of the device 100. In an example, data 305*a* may be stored in the storage 120 prior to the detection of the triggering event 303, and data 305*b* may be added to the storage 120 in response to the detection of the triggering event 303.

In some embodiments, the data 305*b* may comprise, for example, data that the processors 108 are currently processing, data representative of a current state of the device 100, data in a write queue of the processors 108, data is an I/O path, data stored in the cache 112, and/or any other critical data. In some embodiments, the operations at 212 may be optional. For example, the method 200 may proceed without transferring data 305*b* to the storage 120.

At 216, the self-refresh state may be initiated for the storage 120 (e.g., as illustrated in FIG. 3). For example, the storage 120 may continue to periodically or intermittently refresh the stored data (e.g., data 305*a* and 305*b*), even if, for example, the associated memory controlled is disabled or undergoes a reset cycle. Thus, the data 305*a*, 305*b* are not lost, even if the associated memory controlled is at least temporarily disabled.

At 220, the device 100 may execute a reset (e.g., a global reset). For example, if the triggering event 303 was due to a hardware or a software error or a system crash, such a reset may cure the error condition. As the storage 120 is in the self-refresh state, data 305a and 305b stored in the storage 120 may not be lost. In an example, during the reset at 220, the storage 120 continues to be in the self-refresh state. Also at 220, after the reset, the boot up circuitry 104 may be initialized.

At 224, the device 100 (e.g., the circuitry 132) may determine if the parameters 129 are stored in the storage 128 and/or may determine if data transfer from the storage 120 to the storage 124 (e.g., in response to a triggering event) is enabled. If so, the device 100 (e.g., the circuitry 132) may read the parameters 129 from the storage 128, as illustrated in FIG. 4.

Also, the circuitry 132 may determine operating parameters 409 (e.g., see FIG. 4) for one or more components of the device 100, based on reading the parameters 129 and/or taking into account one or more other factors. The one or more other factors may include determining whether the triggering event is due to a power loss, a charge level of an alternate power source (e.g., the battery 140, a super capacitor, etc.), aging of the battery 140, amount of data to be transferred, any preset configuration by the user or manufacturer of the device 100, etc.

In an example, the operating parameters 409 may be in accordance with the various modes discussed herein previously. In an example, the operating parameters 409 may specify operating conditions of individual components, e.g., individual processing cores (e.g., voltage level of a component, operating frequency of a component, whether a component core is to be clock gated and/or power gated, whether a component is to be disabled, and/or the like), as discussed elsewhere in this disclosure in further detail.

At 228, the device 100 (e.g., the circuitry 104) may boot or initialize various components of the device 100, and operate the components, e.g., at least in part in accordance with the operating parameters 409. For example, one or more processing cores of the processors 108 may be initialized and operated in accordance with the operating parameters 409.

At 232, the device 100 may transfer data 305a and/or 305b (or a subset of these data) from the volatile storage 120 to the non-volatile storage 124 (e.g., as illustrated in FIG. 5), while the components of the device 100 operate in accordance with the operating parameters 409. Thus, the device 100 operates in accordance with the operating parameters 409, while data is being transferred from the storage 120 to the storage 124, where the operating parameters 409 may be determined based at least in part on the parameters 129. At 236, the device 100 may be reset once more (e.g., if the triggering event was due to an error in the device 100), or may be shut down (e.g., if the triggering event was due to AC power loss).

Figure 6:
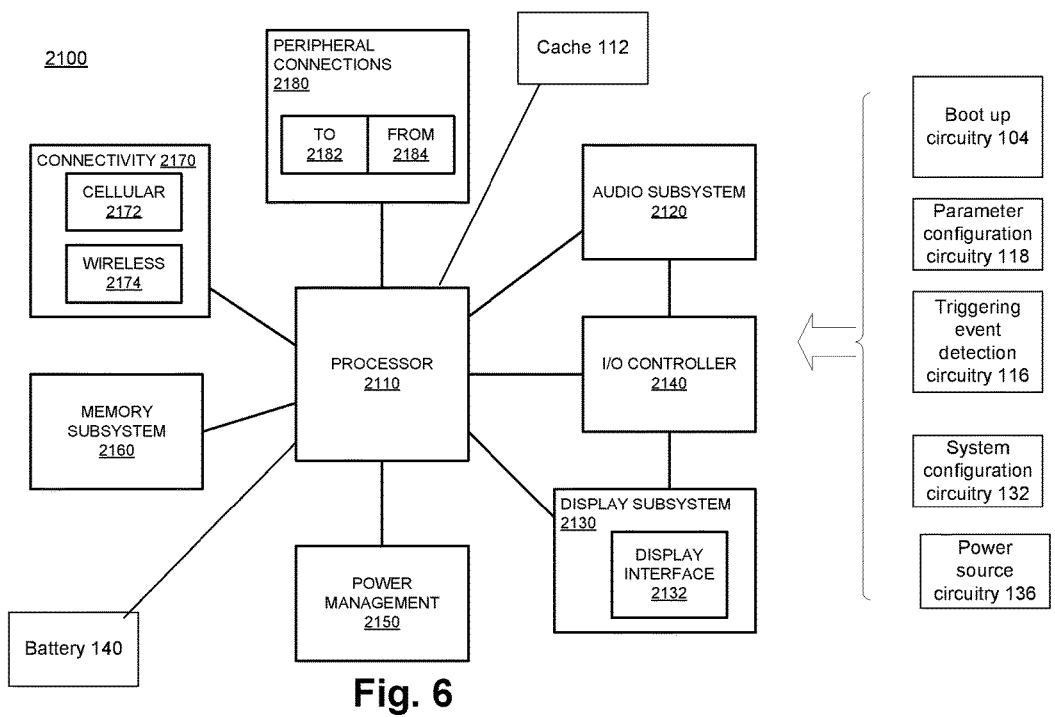
FIG. 6 illustrates a computing device, a smart device, a computer system or a SoC (System-on-Chip), where the computing device may transfer data from a first storage (e.g., a volatile storage) to a second storage (e.g., a non-volatile storage) in a configurable manner, in response to a detection of a triggering event, according to some embodiments.

FIG. 6 illustrates a computing device 2100, a smart device, a computing device or a computer system or a SoC (System-on-Chip) 2100, where the computing device 2100 may transfer data from a first storage (e.g., a volatile storage) to a second storage (e.g., a non-volatile storage) in a configurable manner, in response to a detection of a triggering event, according to some embodiments. It is pointed out that those elements of FIG. 6 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an TOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may implement the device 100 of FIGS. 1 and 3-5. For example, the computing device 2100 may comprise the circuitries 104, 118, 116, 132, 136, etc. In an example, the processor 2110 may comprise the processors 108. The cache 112 may be coupled to the processors 2110. The storages 120, 124, 128 may be included in the computing device 2100 (e.g., in the memory subsystem 2160). The computing device 2100 may operate to transfer data from the storage 120 to the storage 124 in a configurable manner, e.g., in response to detecting a triggering event, e.g., as discussed in this disclosure.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

EXAMPLE 1

An apparatus comprising: a first storage to store one or more parameters, a second storage to store data, and a third storage; a first circuitry to detect a triggering event; and a second circuitry to, in response to the triggering event, cause transfer of the data from the second storage to the third storage, while one or more components of the apparatus is to operate in accordance with the one or more parameters.

EXAMPLE 2

The apparatus of example 1 or any other example, wherein the one or more parameters comprises one or more of: an indication of a first number of processing cores to be operational while the data is being transferred; an indication of a second number of processing cores to be in a low power state or non-operational while the data is being transferred; an indication of one or both of an operating voltage or an operating frequency of a processing core associated with the transfer of the data; an indication of a first mode of a plurality of modes, wherein the one or more components of the apparatus is to operate in accordance with the first mode, while the data is being transferred; or identification of one or more components, which are not used for the transfer of data and which are to operate in a low power state or a non-operational state, while the data is being transferred.

EXAMPLE 3

The apparatus of example 1 or any other example, further comprising: a third circuitry to configure the one or more parameters, based on one or more of: a charge level of a battery of the apparatus, a type of the triggering event, or an amount of data to be transferred.

EXAMPLE 4

The apparatus of example 3 or any other example, wherein the third circuitry is to: configure the one or more parameters to have a first value, in response to the charge level of the battery being higher than a threshold value; and configure the one or more parameters to have a second value, in response to the charge level of the battery being lower than a threshold value, wherein the first value is different from the second value.

EXAMPLE 5

The apparatus of example 3 or any other example, wherein the third circuitry is to: configure the one or more parameters to have a first value that correspond to a first number of components of the apparatus being operational to transfer the data, in response to the triggering event being of a first type; and configure the one or more parameters to have a second value that correspond to a second number of components of the apparatus being operational to transfer the data, in response to the triggering event being of a second type, wherein the first number is different from the second number.

EXAMPLE 6

The apparatus of example 5 or any other example, wherein: the first type of triggering event comprises loss of power supply from an Alternating Current (AC) to Direct Current (DC) adapter that is to supply AC power to the apparatus; the second type of triggering event comprises an error in the apparatus that is to result in a booting or resetting of the apparatus; and the first number is lower than the second number.

EXAMPLE 7

The apparatus of example 3 or any other example, wherein the third circuitry is to: configure the one or more parameters to have a first value that correspond to a first number of components of the apparatus being operational to transfer the data, in response to the amount of data being higher than a threshold value; and configure the one or more parameters to have a second value that correspond to a second number of components of the apparatus being operational to transfer the data, in response to the amount of data being lower than the threshold value, wherein the first number is higher than the second number.

EXAMPLE 8

The apparatus of any of examples 1-6 or any other example, wherein the triggering event comprises one or both of: loss of power supply from an Alternating Current (AC) to Direct Current (DC) adapter that is to supply AC power to the apparatus; or an error in the apparatus that is to result in a booting or resetting of the apparatus.

EXAMPLE 9

The apparatus of any of examples 1-7 or any other example, wherein: the first storage comprises one or more registers; the second storage comprises a volatile memory; and the third storage comprises a non-volatile memory.

EXAMPLE 10

The apparatus of any of examples 1-7 or any other example, wherein: a first subset of the data is stored in the second storage subsequent to, and in response to, the detection of the triggering event; and a second subset of the data is stored in the second storage prior to the detection of the triggering event.

EXAMPLE 11

The apparatus of example 10 or any other example, wherein: first subset of the data is stored in the second storage from one or more of: a cache, a processor, a write queue, or an Input/Output (TO) path.

EXAMPLE 12

A system comprising: a memory to store data; a processor coupled to the memory, the processor comprising a plurality of processing cores; a non-volatile storage; a first circuitry to, in response to a triggering event, cause transfer of the data from the memory to the non-volatile storage; a second circuitry to configure operation of individual ones of the plurality of processing cores in accordance with one or more parameters, while the data is being transferred; and a wireless interface to allow the processor to communicate with another device.

EXAMPLE 13

The system of example 12 or any other example, wherein the one or more parameters comprises one or both of: an indication of a first number of processing cores to be operational while the data is being transferred; or an indication of a second number of processing cores to be in a disabled state while the data is being transferred.

EXAMPLE 14

The system of example 12 or any other example, wherein the one or more parameters comprises: an indication of one or both of an operating voltage or an operating frequency of a processing core associated with the transfer of the data.

EXAMPLE 15

The system of example 12 or any other example, wherein the one or more parameters comprises: an indication of a first mode of a plurality of modes, wherein the plurality of processing cores is to operate in accordance with the first mode, while the data is being transferred.

EXAMPLE 16

The system of example 12 or any other example, wherein the second circuitry is to configure operation of individual ones of the plurality of processing cores further in accordance with one or more of: a charge level of a battery of the system, a type of the triggering event, or an amount of data to be transferred.

EXAMPLE 17

The system of any of examples 12-16 or any other example, wherein the non-volatile storage is one of: a read-only memory (ROM), a flash memory, a flash drive, a magnetic computer storage device, a hard disk drive, a solid state drive, an optical disc, or external hard drive.

EXAMPLE 18

An apparatus comprising: a first storage to store one or more parameters, a second storage to store data, and a third storage; a first circuitry to configure the one or more parameters to have a first value corresponding to a first mode, and to have a second value corresponding to a second mode; a second circuitry to detect a triggering event, and determine a mode of the apparatus based on a type of the triggering event; and a third circuitry to, in response to the triggering event: select one of the first value or the second value for the one or more parameters, based on the determined mode of the apparatus, and cause transfer of the data from the second storage to the third storage, while one or more components of the apparatus is to operate in accordance with the selected one of the first or second values of the one or more parameters.

EXAMPLE 19

The apparatus of example 18 or any other example, wherein: in response to a selection of the first value, a first number of components of the apparatus are to be operational to transfer the data; and in response to a selection of the second value, a second number of components of the apparatus are to be operational to transfer the data, the first number being different from the second number.

EXAMPLE 20

The apparatus of example 19 or any other example, wherein: a first type of triggering event comprises loss of power supply from an Alternating Current (AC) to Direct Current (DC) adapter that is to supply AC power to the apparatus; a second type of triggering event comprises an error in the apparatus that is to result in a booting or resetting of the apparatus; the third circuitry is to select the first value for the one or more parameters, based on the determining the first type of triggering event; the third circuitry is to select the second value for the one or more parameters, based on the determining the second type of triggering event; and the first number is lower than the second number.

EXAMPLE 21

Non-transitory computer-readable storage media to store instructions that, when executed by a processor, cause the processor to: detect an event; access one or more parameters, in response to detecting the event; cause transfer of data from a volatile storage to a non-volatile storage, in response to detecting the event; and operate the processor in accordance with the one or more parameters, while the data is being transferred.

EXAMPLE 22

The non-transitory computer-readable storage media of example 21 or any other example, wherein the instructions cause the processor to: transfer a first subset of the data to the volatile storage, subsequent to the detection of the event and prior to transfer of the data from the volatile storage to the non-volatile storage.

EXAMPLE 23

The non-transitory computer-readable storage media of any of examples 21-22 or any other example, to operate the processor in accordance with the one or more parameters, the instructions cause the processor to: operate, in accordance with the one or more parameters, a first processing core of the processor to transfer the data from the volatile storage to the non-volatile storage; and disable, in accordance with the one or more parameters, a second processing core of the processor, while the data is being transferred from the volatile storage to the non-volatile storage.

EXAMPLE 24

A method comprising: detecting an event; accessing one or more parameters, in response to detecting the event;

causing transfer of data from a volatile storage to a non-volatile storage, in response to detecting the event; and operating the processor in accordance with the one or more parameters, while the data is being transferred.

EXAMPLE 25

The method of example 24 or any other example, further comprising: transferring a first subset of the data to the volatile storage, subsequent to the detection of the event and prior to transfer of the data from the volatile storage to the non-volatile storage.

EXAMPLE 26

The method of any of examples 24-25 or any other example, wherein operating the processor in accordance with the one or more parameters comprises: operating, in accordance with the one or more parameters, a first processing core of the processor to transfer the data from the volatile storage to the non-volatile storage; and disabling, in accordance with the one or more parameters, a second processing core of the processor, while the data is being transferred from the volatile storage to the non-volatile storage.

EXAMPLE 27

An apparatus comprising: means for performing the method of any of the examples 24-26 or any other example.

EXAMPLE 28

An apparatus comprising: means for detecting an event; means for accessing one or more parameters, in response to detecting the event; means for causing transfer of data from a volatile storage to a non-volatile storage, in response to detecting the event; and means for operating the processor in accordance with the one or more parameters, while the data is being transferred.

EXAMPLE 29

The apparatus of example 28 or any other example, further comprising: means for transferring a first subset of the data to the volatile storage, subsequent to the detection of the event and prior to transfer of the data from the volatile storage to the non-volatile storage.

EXAMPLE 30

The apparatus of any of examples 28-29 or any otherexample, wherein the means for operating the processor in accordance with the one or more parameters comprises: means for operating, in accordance with the one or more parameters, a first processing core of the processor to transfer the data from the volatile storage to the non-volatile storage; and means for disabling, in accordance with the one or more parameters, a second processing core of the processor, while the data is being transferred from the volatile storage to the non-volatile storage.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
a first storage to store one or more parameters, a second storage to store data, and a third storage;
a first circuitry to detect a trigger event; and
a second circuitry to, in response to the a trigger event, cause transfer of the data from the second storage to the third storage, while one or more components of the apparatus is to operate in accordance with the one or more parameters,
wherein the one or more parameters comprises one or more of:
an indication of a first number of processor cores to be operational while the data is being transferred;
an indication of a second number of processor cores to be in a low power state or non-operational while the data is being transferred;
an indication of one or both of an operating voltage or an operating frequency of a processor core associated with the transfer of the data;
an indication of a first mode of a plurality of modes, wherein the one or more components of the apparatus is to operate in accordance with the first mode, while the data is being transferred; or
identification of one or more components, which are not used for the transfer of data and which are to operate in a low power state or a non-operational state, while the data is being transferred.

2. The apparatus of claim 1, further comprising:
a third circuitry to configure the one or more parameters, based on one or more of: a charge level of a battery of the apparatus, a type of the trigger event, or an amount of data to be transferred.

3. The apparatus of claim 2, wherein the third circuitry is to:
cause the one or more parameters to have a first value, in response to the charge level of the battery being higher than a threshold value; and
cause the one or more parameters to have a second value, in response to the charge level of the battery being lower than a threshold value, and
wherein the first value is different from the second value.

4. The apparatus of claim 2, wherein the third circuitry is to:
cause the one or more parameters to have a first value that correspond to a first number of components of the apparatus being operational to transfer the data, in response to the trigger event being of a first type; and
cause the one or more parameters to have a second value that correspond to a second number of components of the apparatus being operational to transfer the data, in response to the trigger event being of a second type, and
wherein the first number is different from the second number.

5. The apparatus of claim 4, wherein:
the first type of triggering trigger event comprises loss of power supply from an Alternating Current (AC) to Direct Current (DC) adapter that is to supply AC power to the apparatus;
the second type of triggering trigger event comprises an error in the apparatus that is to result in a booting or resetting of the apparatus; and
the first number is lower than the second number.

6. The apparatus of claim 2, wherein the third circuitry is to:

cause the one or more parameters to have a first value that correspond to a first number of components of the apparatus being operational to transfer the data, in response to the amount of data being higher than a threshold value; and cause the one or more parameters to have a second value that correspond to a second number of components of the apparatus being operational to transfer the data, in response to the amount of data being lower than the threshold value, and wherein the first number is higher than the second number.

7. The apparatus of claim 1, wherein the trigger event comprises one or both of:
loss of power supply from an Alternating Current (AC) to Direct Current (DC) adapter that is to supply AC power to the apparatus; or
an error in the apparatus that is to result in a booting or resetting of the apparatus.

8. The apparatus of claim 1, wherein:
the first storage comprises one or more registers;
the second storage comprises a volatile memory; and
the third storage comprises a non-volatile memory.

9. The apparatus of claim 1, wherein:
a first subset of the data is stored in the second storage subsequent to, and in response to, the detection of the trigger event; and
a second subset of the data is stored in the second storage prior to the detection of the trigger event.

10. The apparatus of claim 9, wherein:
first subset of the data is stored in the second storage from one or more of: a cache, a processor, a write queue, or an Input/Output (IO) path.

11. A system comprising:
a memory to store data;
a processor coupled to the memory, the processor comprising a plurality of processor cores;
a non-volatile storage;
a first circuitry to, in response to a trigger event, cause transfer of the data from the memory to the non-volatile storage;
a second circuitry to cause operation of individual ones of the plurality of processor cores in accordance with one or more parameters, while the data is being transferred;
a third circuitry to:
cause the one or more parameters to have a first value, in response to the charge level of the battery being higher than a threshold value; and
cause the one or more parameters to have a second value, in response to the charge level of the battery being lower than a threshold value,
wherein the first value is different from the second value; and
a wireless interface to allow the processor to communicate with another device.

12. The system of claim 11, wherein the one or more parameters comprises one or both of:
an indication of a first number of processor cores to be operational while the data is being transferred; or
an indication of a second number of processor cores to be in a disabled state while the data is being transferred.

13. The system of claim 11, wherein the one or more parameters comprises:
an indication of one or both of an operation voltage or an operation frequency of a processor core associated with the transfer of the data.

14. The system of claim 11, wherein the one or more parameters comprises:
an indication of a first mode of a plurality of modes, and
wherein the plurality of processor cores is to operate in accordance with the first mode, while the data is being transferred.

15. The system of claim 11, wherein the second circuitry is to cause operation of individual ones of the plurality of processor cores further in accordance with one or more of: a charge level of a battery of the system, a type of the trigger event, or an amount of data to be transferred.

16. The system of claim 11, wherein the non-volatile storage is one of: a read-only memory (ROM), a flash memory, a flash drive, a magnetic computer storage device, a hard disk drive, a solid state drive, an optical disc, or external hard drive.

17. The apparatus of claim 11, wherein the trigger event comprises one or both of:
loss of power supply from an Alternating Current (AC) to Direct Current (DC) adapter that is to supply AC power to the apparatus; or an error in the apparatus that is to result in a booting or resetting of the apparatus.

18. An apparatus comprising:
a first storage to store one or more parameters, a second storage to store data, and a third storage;
a first circuitry to cause the one or more parameters to have a first value corresponding to a first mode, and to have a second value corresponding to a second mode;
a second circuitry to detect a trigger event, and determine a mode of the apparatus based on a type of the trigger event; and
a third circuitry to, in response to the trigger event:
select one of the first value or the second value for the one or more parameters, based on the determined mode of the apparatus, and
cause transfer of the data from the second storage to the third storage, while one or more components of the apparatus is to operate in accordance with the selected one of the first or second values of the one or more parameters, wherein in response to a selection of the first value, a first number of components of the apparatus are to be operational to transfer the data.

19. The apparatus of claim 18, wherein:
in response to a selection of the second value, a second number of components of the apparatus are to be operational to transfer the data, the first number being different from the second number.

20. The apparatus of claim 19, wherein:
a first type of trigger event comprises loss of power supply from an Alternating Current (AC) to Direct Current (DC) adapter that is to supply AC power to the apparatus;
a second type of trigger event comprises an error in the apparatus that is to result in a booting or resetting of the apparatus;
the third circuitry is to select the first value for the one or more parameters, based on the determination that the first type of trigger event;
the third circuitry is to select the second value for the one or more parameters, based on the determination that the second type of trigger event; and
the first number is lower than the second number.

* * * * *